United States Patent [19]
Glasson

[11] Patent Number: 5,781,450
[45] Date of Patent: Jul. 14, 1998

[54] OBJECT INSPECTION SYSTEM AND METHOD

[75] Inventor: J. Peter Glasson, Portsmouth, N.H.

[73] Assignee: Metronics, Inc., Bedford, N.H.

[21] Appl. No.: 758,966

[22] Filed: Dec. 2, 1996

Related U.S. Application Data

[63] Continuation-in-part of Ser. No. 558,767, Nov. 15, 1995, Pat. No. 5,590,060, which is a continuation of Ser. No. 258,123, Jun. 10, 1994, abandoned.

[51] Int. Cl.$^6$ ............................................. G01B 5/24
[52] U.S. Cl. ......................... 364/560; 364/188; 33/504
[58] Field of Search ......................... 364/167.01, 468, 364/188, 474.24–474.28, 514 R, 474.29, 552, 560 E, 474.37, 559, 474.35; 356/445, 446, 378, 394, 384, 371, 429, 430, 138, 376; 382/106, 181, 190, 209; 395/50, 51, 919; 33/503–505, 545, 546, 1 M, 556; 318/570

[56] References Cited

U.S. PATENT DOCUMENTS

| | | | |
|---|---|---|---|
| 4,693,608 | 9/1987 | Kitagawa et al. | 356/394 |
| 4,901,256 | 2/1990 | McMurtry et al. | 364/560 |
| 4,945,501 | 7/1990 | Bell et al. | 364/571.05 |
| 4,977,361 | 12/1990 | Phillips et al. | 318/640 |
| 5,208,763 | 5/1993 | Hong et al. | 364/551.02 |
| 5,590,060 | 12/1996 | Granville et al. | 364/560 |

*Primary Examiner*—James P. Trammell
*Assistant Examiner*—Craig Steven Miller
*Attorney, Agent, or Firm*—Iandiorio & Teska

[57] ABSTRACT

An object inspection system including a coordinate measuring device with a touch probe for inspecting an object having one or more feature types and a computer subsystem connected to the coordinate measuring device which stores the direction of movement and the coordinates of the probe at each contact of the probe with a feature on the object. There is an algorithm which automatically determines, from the direction of movement of the probe and the coordinates, the feature type defined by the coordinates.

58 Claims, 11 Drawing Sheets

OBJECT INSPECTION SYSTEM AND METHOD

RELATED INVENTORS

This application is a continuation-in-part application of U.S. application Ser. No. 08/558,767, filed Nov. 15, 1995 (now U.S. Pat. No. 5,590,060) which is a continuation of U.S. application Ser. No. 08/258,123 filed Jun. 10, 1994 now abandoned.

FIELD OF INVENTION

An object inspection system including a touch probe coordinate measuring device for use in three dimensional measurement and inspection in quality assurance efforts for a wide variety of objects including component parts and assemblies.

BACKGROUND OF INVENTION

Touch probe measuring devices such as the Mitutoyo model "MXF203" coordinate measuring machine are used for three dimensional measurement and inspection in quality assurance efforts for a wide variety of objects including component parts and assemblies. For example, a small plate may have a cone machined into its surface (e.g. a valve seat) and one or more cylindrical bolt holes. Before shipment, the orientation, diameter and location of these features is measured by a touch probe coordinate measuring device to insure that the plate was properly machined. Larger touch probe devices are used to inspect whole automobile and aircraft bodies.

The problem with currently available touch probe coordinate measuring devices is the cumbersome and time consuming interaction between the operator of the device and the menu driven software which runs the device.

The operator typically stands near the part to be inspected located on a reference surface and maneuvers the touch probe using a joy stick. The computer display and keyboard and/or mouse used to select the menu items relating to the feature under inspection may or may not be in a convenient location with respect to the operator's work area. The operator typically interacts with the computer screen to select or input a feature type and then returns to the part on the measuring device where the operator uses a joy stick to maneuver the probe to contact the various points of the selected feature. The data points are entered into the computer system each time the probe contacts the selected feature or the operator then pushes a button on the joy stick to "enter" those data points. To enter data points for another feature, however, the operator must return to the computer display and select that feature type or mode.

For example, if a bore in a part is to be measured, the menu driven commands require the operator to select a "cylinder" feature and then enter three points at the top of the cylinder and three points at the bottom of the cylinder. A computer program operating within the computer connected to the coordinate measuring device then calculates and displays the diameter of the bore, the mid-point, and other relevant data.

Note that the operator is first required to inform the system that he is ready to input data points representing a cylinder. This limitation occurs because current computer algorithms cannot compute a cylinder from data points which could also represent two simple circles, or a cone, or a sphere, or a segment of a cylinder.

This repeated interaction between the operator and the computer wherein the operator must first indicate the type of the feature to be measured before the data points are entered is cumbersome and time consuming. The operator must divert his attention away from the task at hand each time he is required to enter the information concerning a particular feature to be inspected. This causes a break in concentration and the possibility for operator error. Moreover, the computer screen and keyboard may not always be located near the operator's work space. Sometimes, the computer screen and keyboard are located across the room or even in a separate room.

So, to inspect three features on a part (e.g., a cone, a cylinder, or a planar surface), the operator must first walk over to the computer screen and select the first feature type (e.g. a cone) and then walk back to the touch probe device and enter six or more points on the cone. The operator must then walk back over to the computer screen and select the second feature type (e.g. a cylinder) and then again walk back to the touch probe device and enter six or more data points on the cylinder feature. Finally, the operator must return to the computer screen and select a third feature type (e.g. a plane) and then return again to the touch probe device and enter three or more data points on the planar surface.

When many features on many parts are inspected during the course of a day, this "feature selection" procedure required of the prior art results in a significant delay and hence a significant cost in the inspection and quality assurance process. As a result, the cost of parts under inspection increases significantly. Worse, because the operator's attention is constantly diverted from the work at hand, the potential for operator error increases as the work day progresses.

In summary, the currently available touch probe coordinate measuring systems cannot compute the various attributes of a feature type (e.g., cylinder, cone, plane), without first being told the feature type to be inspected. This results in a significant loss of time and a constant diversion of the operator's attention away from the work at hand.

SUMMARY OF INVENTION

It is therefore a goal of this invention to provide an object inspection system and method which eliminates the need for the operator to enter the feature type before the feature is measured and inspected.

It is a further goal of this invention to provide such an object inspection system and method which automatically determines the type of feature under inspection.

It is a further goal of this invention to provide such an object inspection system and method which insures that the operator's attention remains fixed on the work at hand.

It is a further goal of this invention to provide such an object inspection system and method which eliminates the need for the operator to constantly walk over to the computer screen and interact with the computer programming of the system.

It is a further goal of this invention to provide such an object inspection system and method which reduces the potential for operator error.

It is a further goal of this invention to provide such an object inspection system and method which lowers the cost of inspection and quality assurance efforts.

It is a further goal of this invention to provide such an object inspection system and method which results in lower cost parts and components.

This invention results from the realization that the efficiency of currently available touch probe coordinate measuring systems can be increased by eliminating the need for the operator to input and establish the feature typed to be inspected before the data points for that feature are entered. Instead, the invention features a unique algorithm for automatically determining the type of feature which is represented by the entered data points without having to be told before hand or after the data points are entered thus insuring that the operator's attention remains fixed on the work at hand and eliminating the need for the operator to constantly walk over to the computer screen to interact with the programming. This "hands-off" approach is accomplished in part by detecting the probe position and the direction of movement of the probe as it contacts a feature on the object under inspection and a unique algorithm which uses the direction-of-movement and probe position data to discriminate between various feature types including spheres, cylinders, cones, planes, lines, single points, arcs, and circles. The hands off approach is also accomplished by classifying different feature types based on the size and characteristics of a minimum bounding box which includes the entered data points representing the feature.

This invention features an object inspection system. There is a coordinate measuring device including a touch probe for inspecting an object having one or more feature types. A computer subsystem is connected to the coordinate measuring device, which includes means for storing the direction of movement of the probe at each contact of the probe with a feature on the object; means for storing the coordinates of the probe at each contact of the probe with a feature on the object; and processing means for automatically determining, from the direction of movement of the probe and said coordinates, the feature type defined by the coordinates.

The computer subsystem typically includes a display and means for displaying the feature type determined by the processing means. Further included are means for inputting an indication when all the data points for a feature are entered.

The processing means displays the coordinates of the probe if only one data point is entered but otherwise calculates the length of the vectors of a bounding box which includes all the coordinates. The means for calculating further includes means for determining the minimum length vector and the maximum length vector of the bounding box and there are means for classifying groups of feature types according to the ratio of the lengths of the vectors. Further included are means for classifying groups of feature types according to the ratio of the length of the vectors and the direction of movement of the probe and/or for classifying groups of feature types according to the ratio of the lengths of the vectors and the number of data points entered for a feature. Alternatively, groups of feature types are classified according to the ratio of the lengths of the vectors, the direction of movement of the probe, and the number of data points entered for a feature, and or the direction of the minimum vector.

The processing means automatically defines a feature to be a line if the ratio of the lengths of the vectors is less than the first preset threshold and the direction of movement of the probe meets a second preset threshold. The processing means automatically defines the feature to be a plane if the ratio of the lengths of the vectors is less than a third preset threshold and the direction of movement of the probe meets a fourth preset threshold. The processing means automatically defines the feature to be long narrow cylinder if the ratio of the lengths of the vectors is less than a fifth preset threshold and the direction of movement of the probe meets a sixth preset threshold.

In a preferred embodiment, the computer subsystem further includes means for calculating the form, fit, and arc angle of the feature and the processing means is responsive to the calculated form, fit, and arc angle, for defining the feature type. The system further includes means for checking for calculation errors which could result, for example, by the number of iterations exceeding a predefined threshold. In responsive to calculation errors, a unique error routine includes means for flagging the coordinates and for automatically resuming processing after the coordinates are flagged. Alternatively, another feature type is calculated.

This invention also features an object inspection system comprising: a coordinate measuring device including a touch probe for inspecting an object having one or more feature types; a computer subsystem connected to the coordinate measuring device, the computer system including: means for storing the direction of movement of the probe at each contact of the probe with a feature on the object; means for storing the coordinates of the probe at each contact of the probe with a feature on the object; means for calculating the length of the vectors of a bounding box which includes all the coordinates; means for determining the ratios of the length of the three vectors of the bounding box; and processing means for automatically determining, from the direction of movement of the probe, the coordinates, and the ratios, the feature type defined by the coordinates.

This invention also features an object inspection system comprising: a measuring device including, but not limited to, touch probe-type devices for inspecting an object having one or more feature types. There is a computer subsystem connected to the coordinate measuring device, which includes means for storing the coordinates of data points entered for a feature on the object; means for calculating the length of the vectors of a bounding box which includes all the coordinates; means for determining the minimum length vector and the maximum length vector of the bounding box; means for calculating the ratios of the length of these vectors; and processing means for automatically determining, from the ratios of the vectors and the coordinates, the feature type defined by the coordinates. If the coordinate measuring device includes a touch probe, the system further including means for storing the direction of movement of the probe at each contact of the probe with a feature of the object and the processing means is typically responsive to the direction of movement of the probe for determining the feature type.

A first routine is involved if the ratio meets a first criteria; a second routine is involved if the ratio meets a second criteria; and a third routine is involved if the ratio meets a third criteria. The first routine includes means for distinguishing between feature types including a line, a long narrow cylinder, and a long narrow cone. Second routine includes means for distinguishing between feature types including planes, lines, circles and arcs. The third routine includes means for distinguishing between feature types including spheres, cylinders, and cones.

This invention also features an object inspection method. A coordinate measuring device including a touch probe is used to inspect an object having one or more feature types. A computer subsystem connected to the coordinate measuring device is programmed to store the direction of movement of the probe at each contact of the probe with a feature on the object; to store the coordinates of the probe at each contact of the probe with a feature on the object; and to automatically determine, from the direction of movement of the probe and the coordinates, the feature type defined by the coordinates.

The method further includes calculating the length of the vectors of a bounding box which includes all the coordinates and determining the length of the minimum vector and the maximum vector and the third vector of the bounding box.

Groups of feature types are classified according to the ratio of the vectors. Other criteria used to classify feature types include the ratio of the vectors, the direction of movement of the probe, the number of data points entered for a feature.

The method typically includes calculating the form, arc angle and/or the radius of the feature and using this information to define the feature type. An error routine is invoked if the calculations fail. The error routine flags the coordinates and automatically resumes processing after the coordinates are flagged to ensure the inspection operation is not interrupted.

DISCLOSURE OF PREFERRED EMBODIMENT

Other objects, features and advantages will occur to those skilled in the art from the following description of a preferred embodiment and the accompanying drawings, in which.

Figure 1:
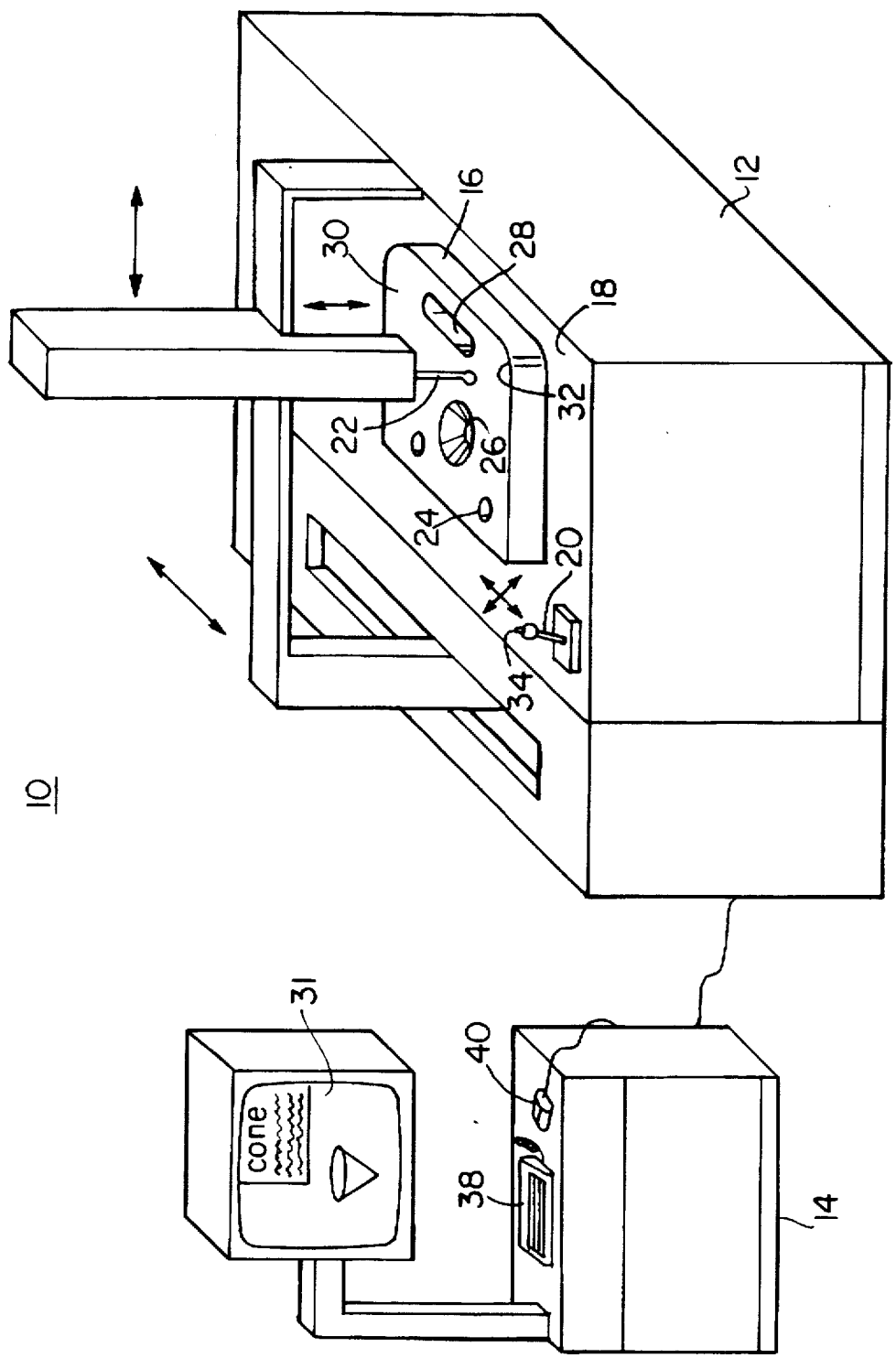
FIG. 1 is a three dimensional diagram of the primary components of the object inspection system of this invention.

Object inspection system 10, FIG. 1 of this invention includes coordinate measuring device 12 such as a Mitutoyo model "MXF203" device with automatic probe compensation. Connected to coordinate measuring device 12 is computer subsystem 14.

As discussed in the Background of Invention above, a part 16 to be inspected is placed on surface 18 of coordinate measuring device 12 and the operator uses joy stick 20 to maneuver touch probe 22 about object 16 to measure bore 24 (a cylinder), cone 26 channel 28, planar surface 30, arc 32, and the like. Software, operating on computer 14 typically has the capability to calculate and store the direction of the movement of probe 22 and the coordinates of the probe at each contact of the probe with a feature on object 16. The software then calculates and displays on computer monitor 31 the various attributes of each feature inspected. The operator uses joy stick 20 to move probe 22 and button 34 (or a mouse or some other data entry device) to inform computer subsystem 14 that all the data points for a particular feature have been entered. Computer subsystem 14 typically includes a pentium processor based system with the "Windows NT" operating system software.

As discussed in the Background of Invention above, the primary limitation of prior art systems of this type is the requirement that the operator must divert his attention away from the work at hand each time a new feature is to be measured. Typically, the operator must use keyboard 38 or mouse 40 of computer subsystem 14 to enter the first feature type to be measured, such as cylinder 24, and then return to device 12 and use joystick 20 to maneuver probe 22 within cylinder 24. Once this feature has been measured, the operator then returns to computer work station 14 and enters the next feature type to be measured such as cone 26. The operator then returns to joy stick 20 and maneuvers touch probe 22 about cone 26. This prior art procedure is highly inefficient. Computer work station 14 is often some distance from coordinate measuring device 12, but even if it is located close by, the operator's attention is constantly diverted from the delicate work at hand.

In accordance with this invention, however, computer subsystem 14 is programmed to automatically determine the feature type defined by the coordinates from the direction of movement of probe 22 and the coordinates of the probe at each contact of the probe with a feature on object 16. In other words, system 10, of this invention eliminates the need for the operator to input and establish the feature type to be inspected before the data points for that feature are entered. Instead, the algorithms discussed with reference to the flow charts depicted in FIGS. 2–10 automatically determine the type of feature which is represented by the entered data points without having to be told before hand or at any time during the data entry process.

Figure 2:
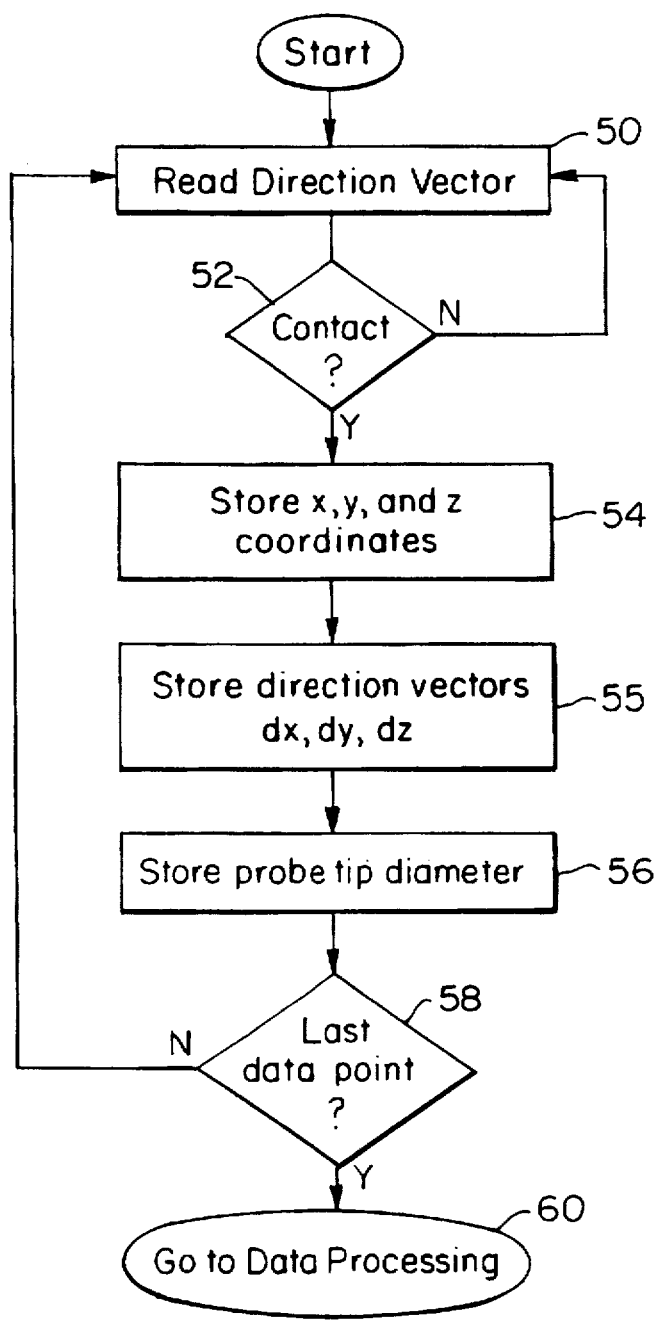
FIG. 2 is a flow chart of the algorithm for storing the direction of movement of the probe and the coordinates of the probe each time the probe contacts a feature of the object under inspection.

Computer 14 is programmed in accordance with the flow chart depicted in FIG. 2. The direction of movement of probe 22 is continuously read, step 50, FIG. 2, until the probe contacts a feature on the object, step 52. At that point, the x, y, and z coordinates of the contact point are stored, step 54, as are the directions of probe movement vectors, step 55. The probe tip diameter is stored, step 56, for use in a probe compensation function since the actual x, y, and z coordinates are offset by the radius of the probe tip used. Once the last data point has been entered for that particular feature, step 58, data processing begins, step 60, in accordance with the flow chart shown in FIG. 3.

Figure 3:
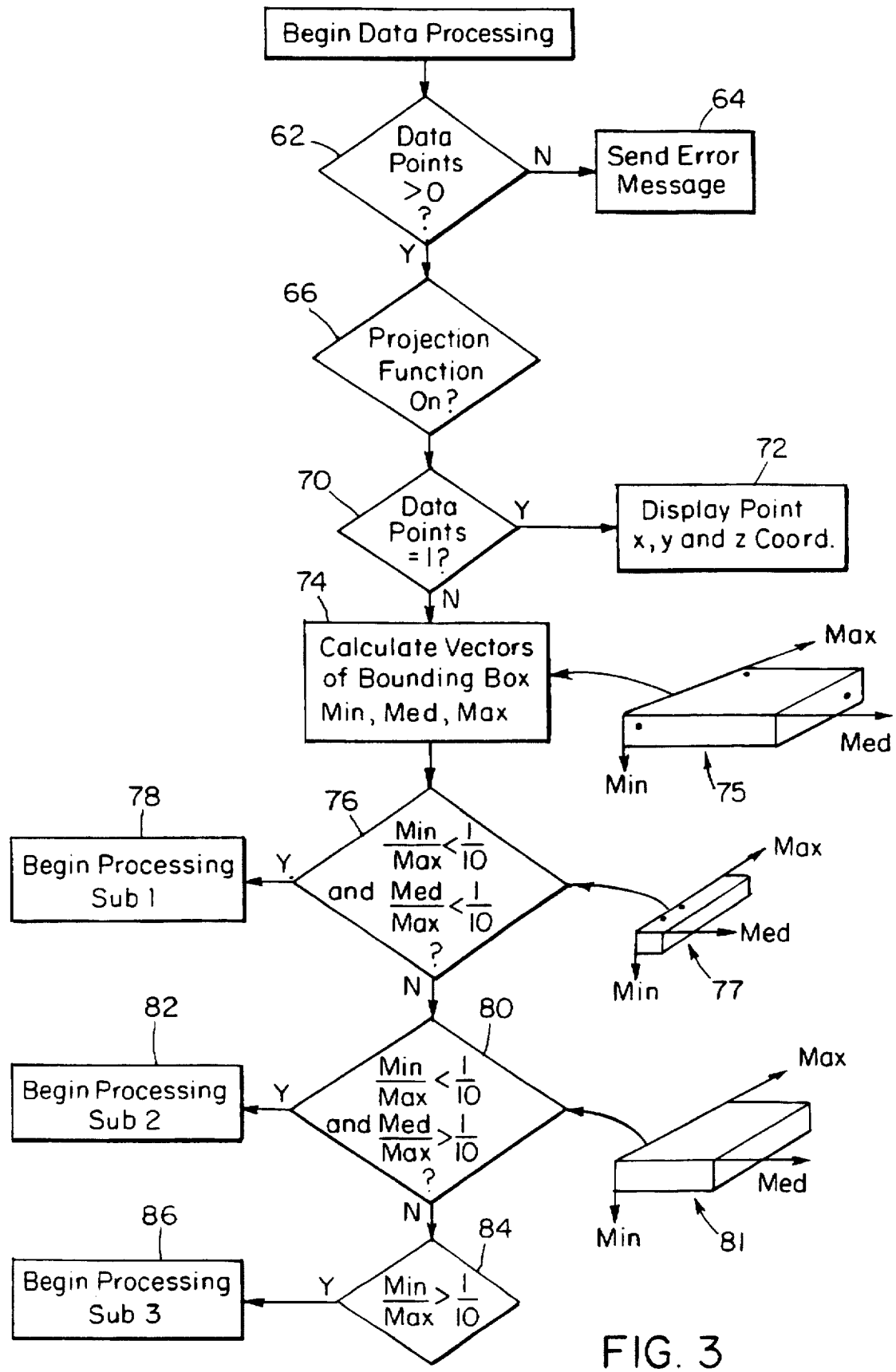
FIG. 3 is a flow chart of the algorithm for calculating the vectors of a minimum bounding box which includes all of the data points entered by the operator in accordance with this invention.

If the number of data points entered is not greater than zero, step 62, FIG. 3, an error message is sent, step 64. If number of data points is greater than zero, a check is made to ensure that the projection function is activated, step 66. If the projection state is "off" or if projection is set to a specific plane, i.e. the XY, YZ, or ZX plane, then this setting acts as an additional constraint on the possible outcome. A projection "off" state produces three dimensional features such as plane, cylinder, and the like. While projection set to a plane produces only point, circle, arc, or line results (projected to that plane). Projection set to "automatic" may result in any of the possible types with projection automatically determined as appropriate. The invention also determines the projection of the feature where appropriate.

If only one data point is entered, step 70, that point and its coordinates are displayed, step 72. Accordingly, the single point is the simplest feature type to define. Note, however, that the prior art required the operator to select a point feature before the touch probe was maneuvered to contact the particular point on the object under inspection.

If more than one data point has been entered, the minimum orthogonal prism which contains all the entered data points is calculated using the "IMSL library" available from Digital Numerics. Essentially, an eigenvector expansion is calculated and the program returns with three orthogonal vectors defining the "minimum bounding box" for the data points. The convention used herein labels the vectors, "min", "med", and "max" depending on their length as shown at 75. The subroutine for calculating the average absolute direction of probe movement is shown in more detail in FIG. 4.

Figure 4:
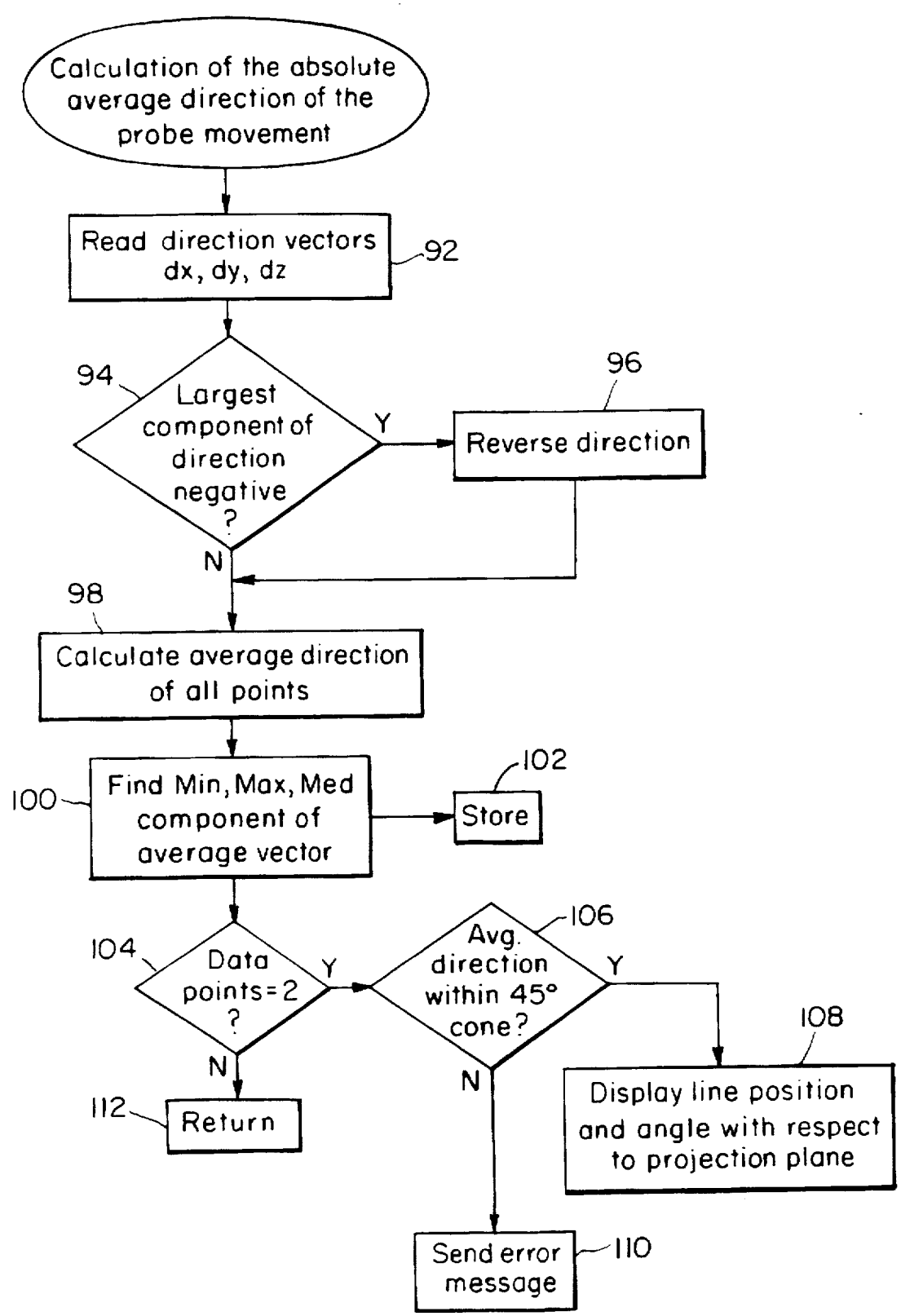
FIG. 4 is a flow chart of the algorithm for calculating the absolute average direction of probe movement.

The direction vectors of the probe are read, step 92, FIG. 4 from the stored information as described with respect to step 55, FIG. 2. If the largest component of the direction vectors is negative, step 94, the direction is reversed, step 96, and then the average direction of all the points is calculated, step 98. The minimum, maximum, and medium components of the average vector are then calculated, step 100, and stored, step 102. Thus, the minimum, medium, and maximum size of the minimum bounding box is calculated along with the minimum, medium, and maximum average direction of probe movement.

At this stage of the processing, if there are only two data points, step 104, and the direction of each point is within 45° of the average direction calculated in step 98 (is within a 45°), cone, step 106, a line is displayed, step 108. Typically, the line position, and its angle with respect to the projection plane is displayed on computer monitor 32, FIG. 1. Other parameters concerning the line may be calculated and displayed. If the two data points are not within 45° of the average direction, an error message is sent, step 110. Alternatively, a "distance" feature type may be displayed. If there are more than two data points, processing returns, step 112, to the main routine, FIG. 3.

Thereafter, the processing is divided into three separate but interconnected subroutines 78, 82 and 86, FIG. 3. If the ratio of the minimum size vector to the maximum size vector is less than 1/10 and the ratio of the medium size vector to the maximum size vector is also less than 1/10, a transfer is made to subprocessing routine 78, discussed with reference to FIGS. 5A and 5B. Features which meet this criteria generally fit within a long, thin, narrow bounding box as shown at 77. Such features include lines, long narrow cylinders, long narrow cones, and long narrow arc cylinders.

Figure 6A:
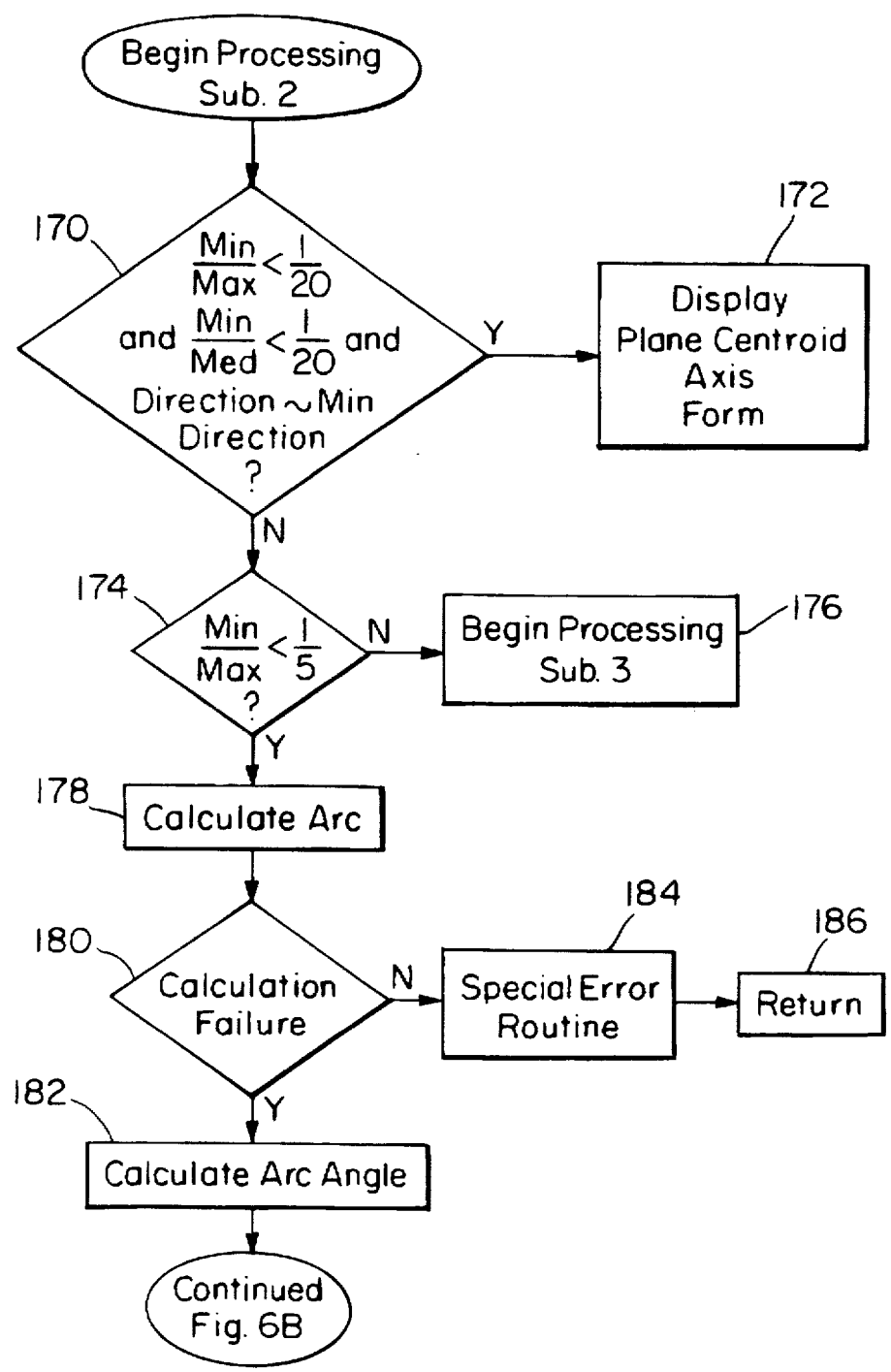
FIGS. 6A and 6B is a flow chart depicting a routine for determining another set of feature types under inspection based on the ratio of the bounding box vectors.
Figure 6B:
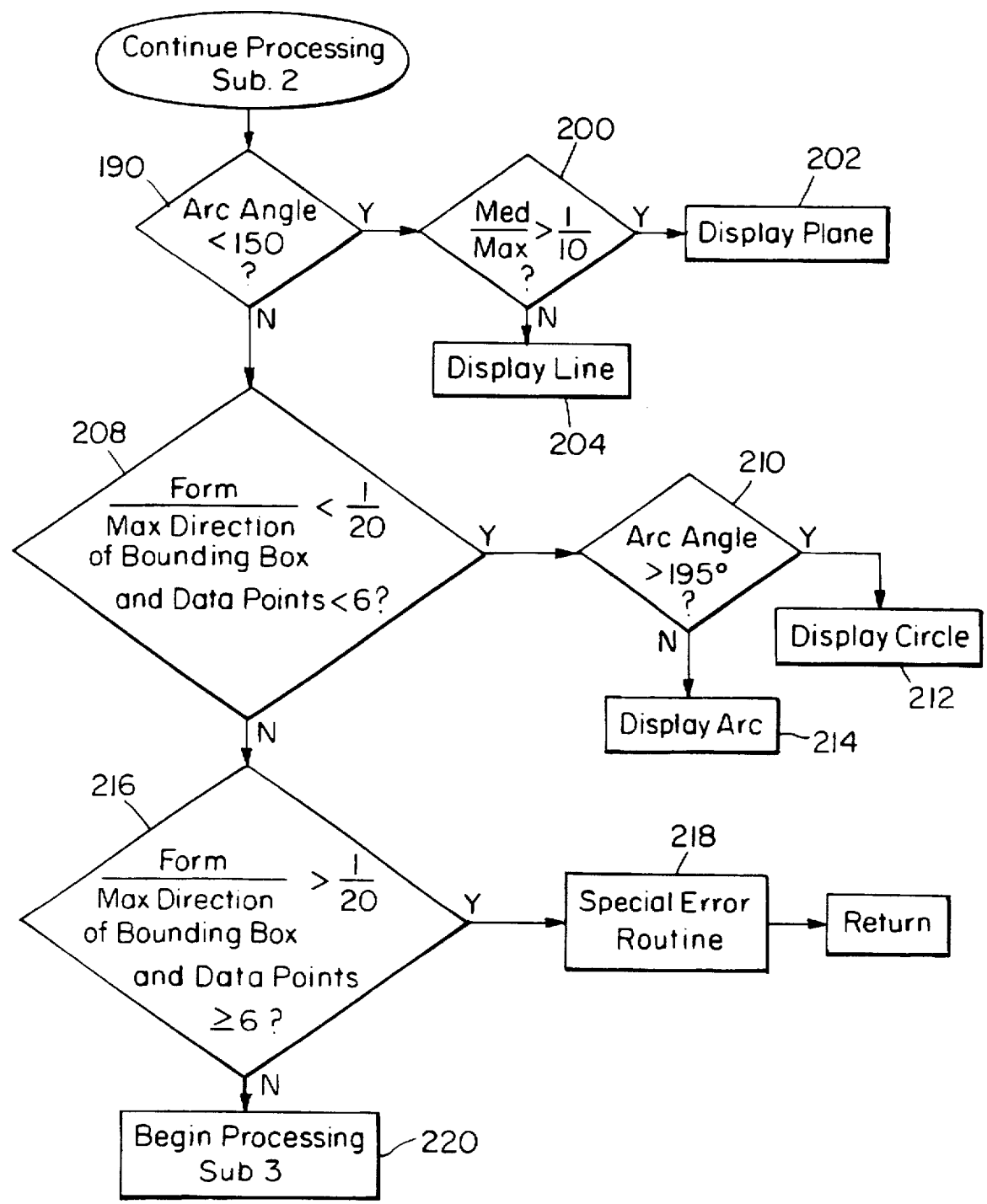

If the ratio of the minimum bounding box vector to the maximum vector is less than 1/10 but the ratio of the medium vector to the maximum vector is greater than 1/10, a transfer is made to a second subroutine, step 82, FIG. 3, further described with respect to FIGS. 6A and 6B. Data points representing features which meet this criteria generally fit within plate-shaped box, thin but wide and long as shown at 81. Such features include arcs, planes, lines and circles.

Figure 7:
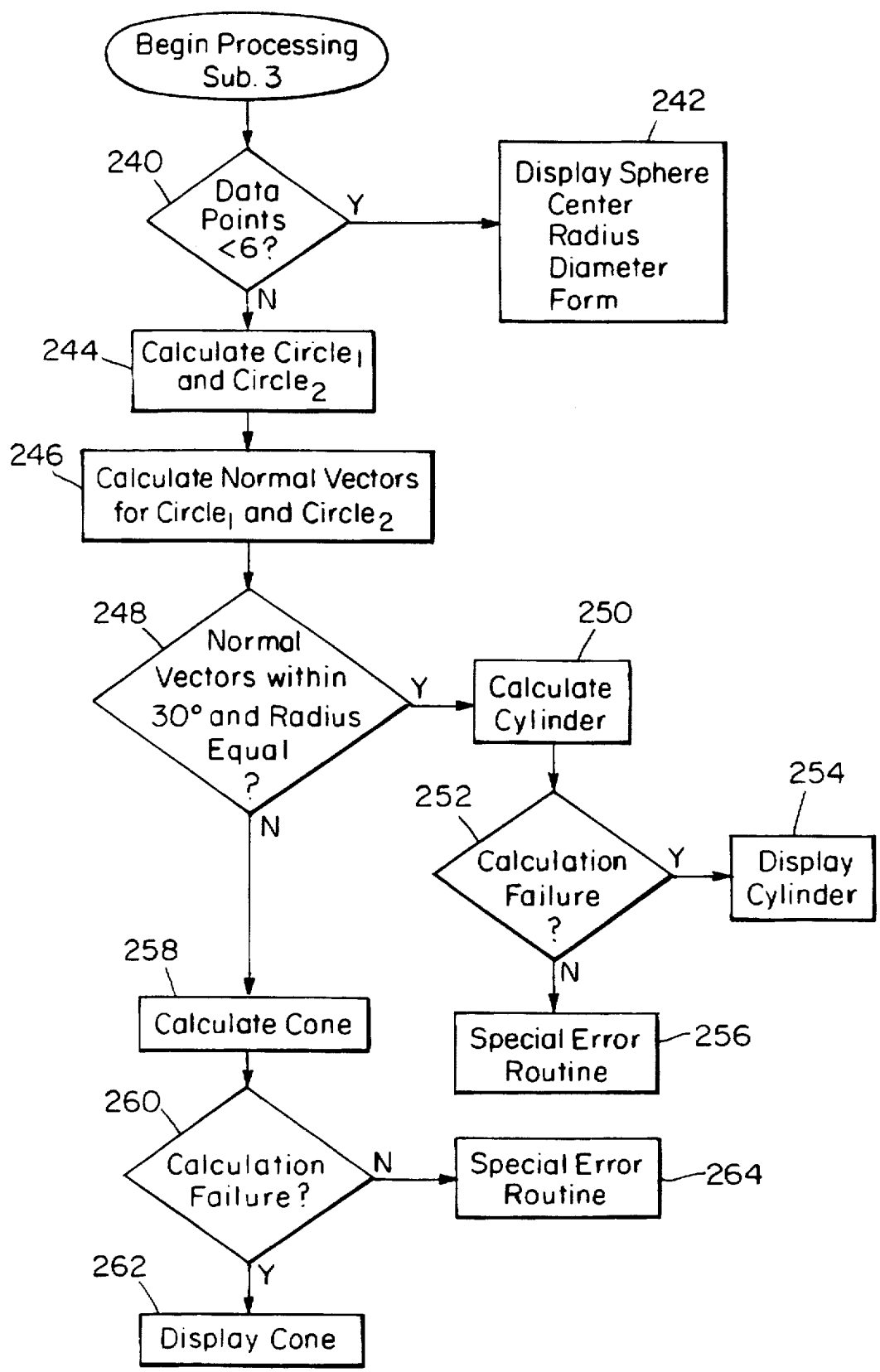
FIG. 7 is a flow chart depicting a routine for determining still another set of feature types based on the ratio of the bounding box vectors.
Figure 8:
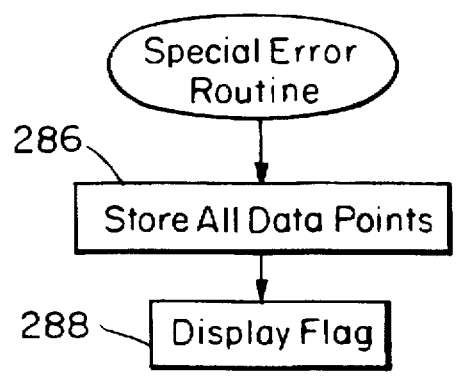
FIG. 8 is a flow chart depicting a special error routine in accordance with this invention.
Figure 9:
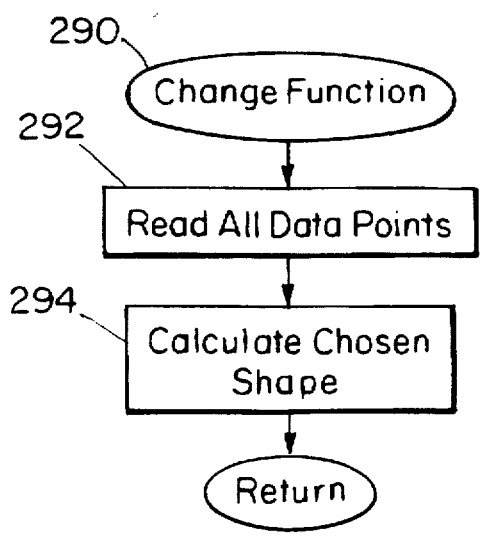
FIG. 9 is a flow chart depicting the error correction function routine of this invention.
Figure 10:
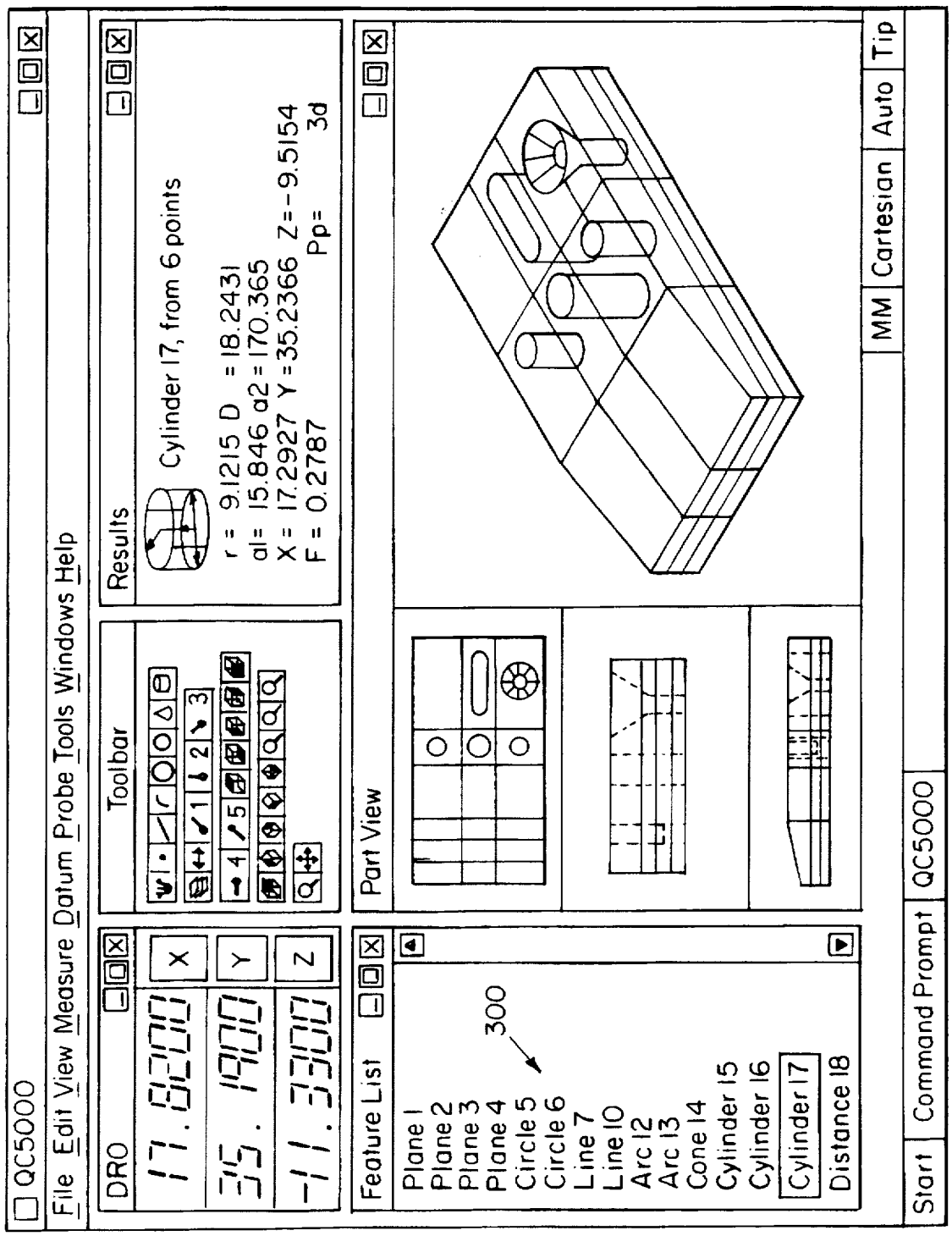
FIG. 10 is a view showing the computer screen read out of the object inspection system of this invention.

If the ratio of the minimum bounding box vector to the maximum bounding box vector is greater than 1/10, step 84, FIG. 3, another subroutine is invoked, step 86 as further described with reference to FIG. 7. Features which meet this criteria include spheres, cylinders, and cones.

Figure 5A:
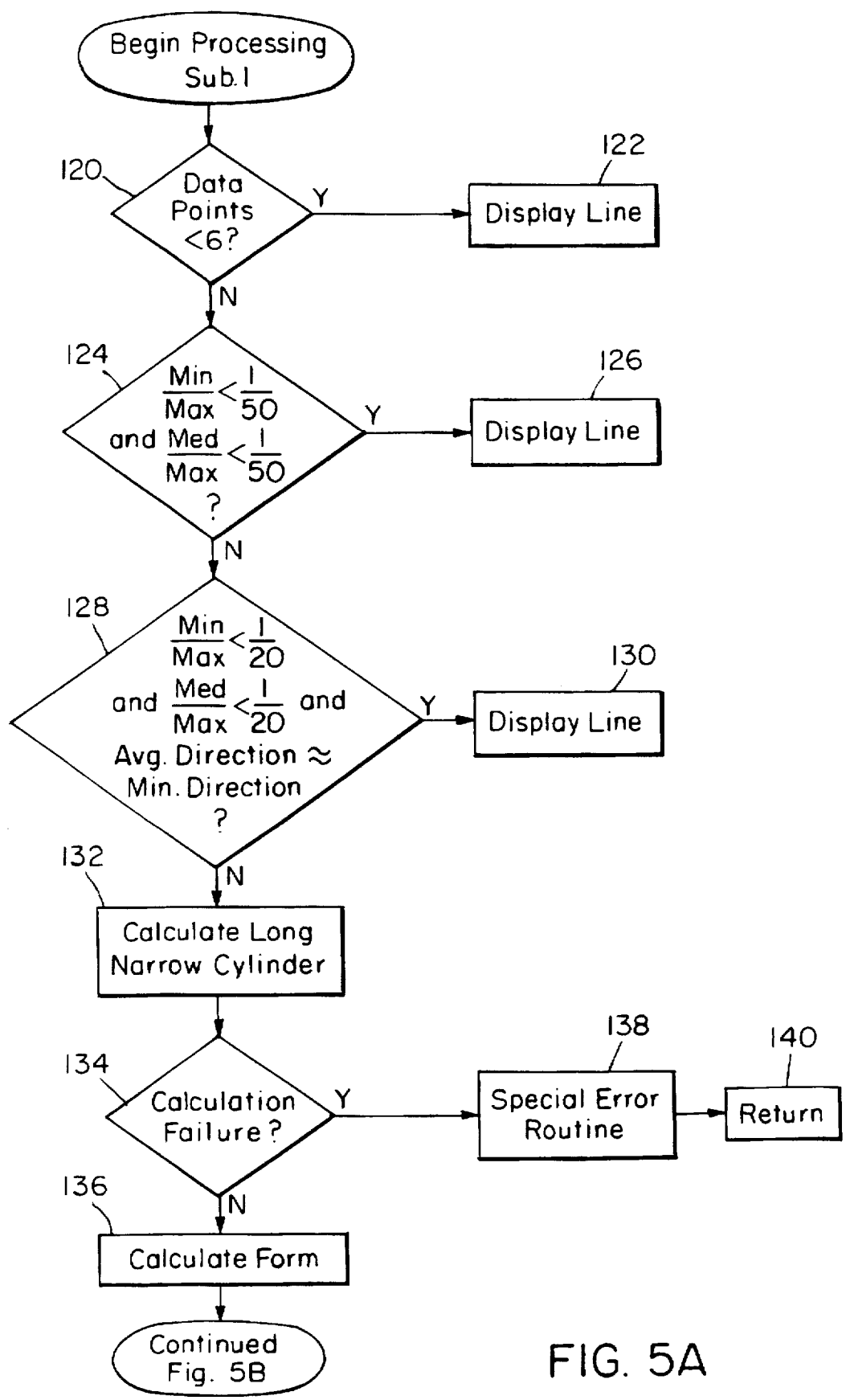
FIGS. 5A and 5B is a flow chart depicting a routine for determining one set of feature types under inspection based on the ratio of the bounding box vectors.

The first routine, FIG. 5A, begins by checking whether the number of data points entered is less than 6, step 120, FIG. 5A. If so, a line is displayed, step 122, similar to step 108, FIG. 4. A line is also displayed, step 126, if the ratio of the minimum size bounding box vector to the maximum size bounding box vector is less than 1/50 and the ratio of the medium size vector to the maximum size vector is less than 1/50. Such a long thin bounding box is typically indicative of a line. If these criteria are not met, the bounding box requirements are changed, step 128. A line is also displayed, however, if even under these conditions, the average probe direction calculated in step 98, FIG. 4, is approximately the same as the minimum direction of the bounding box direction. Otherwise, a long narrow cylinder is calculated, step 132. The difference between the set of data points defining a long narrow cylinder and a set of data points defining a line is thus determined by the probe direction since the operator will generally approach a line feature from the same direction each time the operator causes the probe to make contact with the surface. In contrast, when the probe is inserted inside a cylinder, the operator typically moves the probe over to one side of the cylinder wall and then back over to the other side of the cylinder wall.

If the calculations concerning the data points for the long narrow cylinder calculation pass, step 134, the form (best fit) is calculated, step 136. Otherwise, a special error routine is generated, step 138, and processing returns, step 140. The calculations could fail, inter alia, because a solution was not reached after a preset number of iterations. The special error routine is explained in more detail with reference to FIG. 9. Also, a jump could be made to calculate another feature type in response to a calculation failure.

Figure 5B:
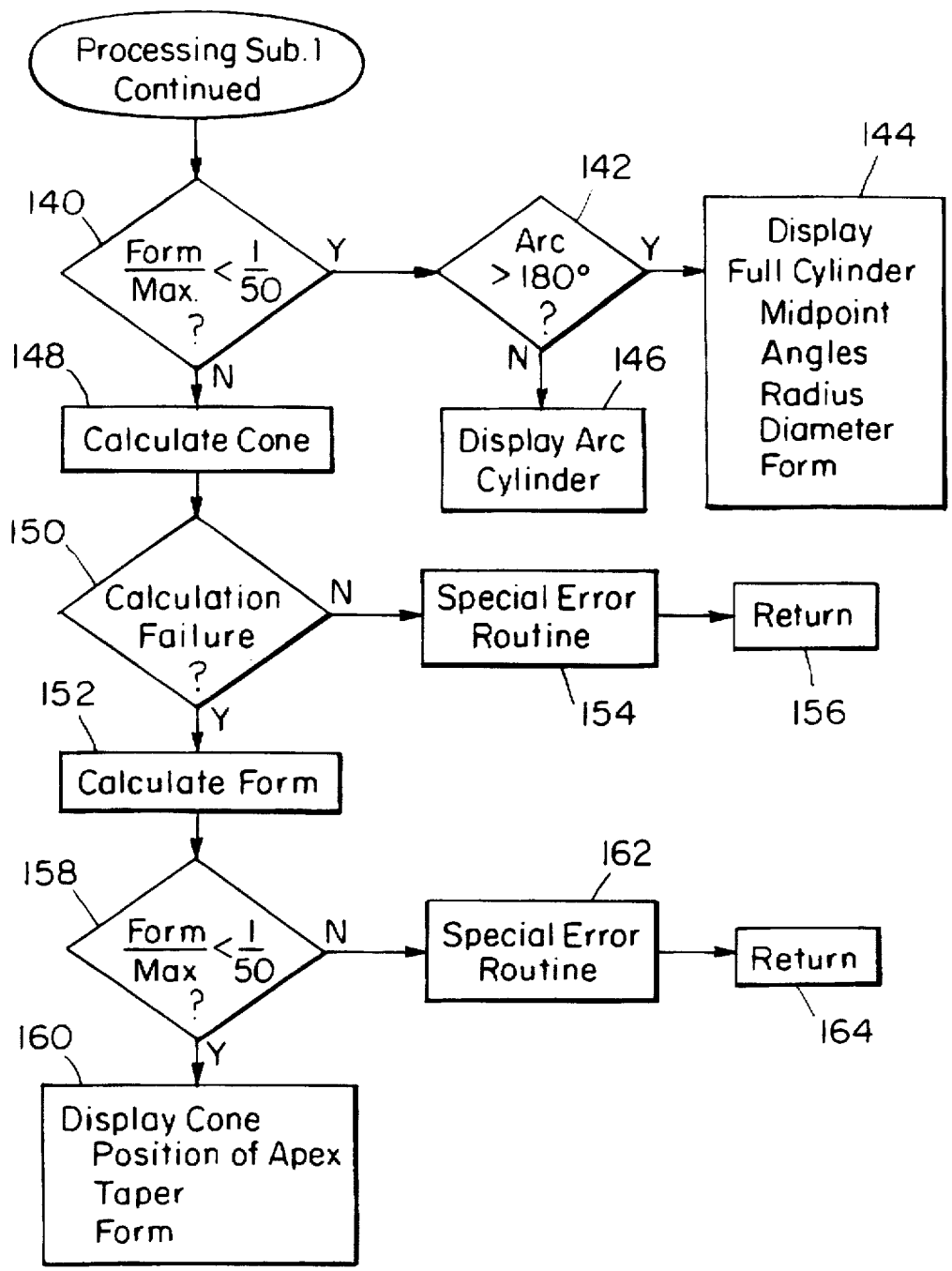

If the ratio of the form to the maximum bounding box dimension is less than 1/50, step 140, and the arc angle of the cylinder is greater than 180°, step 142, FIG. 5B, a full cylinder is displayed, step 144. Typically, the data associated with a full cylinder includes the mid-point of the cylinder axis, the angle of the axis, the radius, the diameter, and the form. If the arc angle is less than 180°, an arc cylinder is displayed, step 146. If the ratio of the form to the maximum vector of the minimum bounding box is greater than 1/50, a cone is calculated, step 148. If the calculation passes, step 150, the form is calculated, step 152; otherwise, the special error routine is invoked, step 154 and processing returns, step 156. If the ratio of the form to the maximum vector of the minimum bounding box is less than 1/50, step 158, a cone is displayed, step 160. Typical parameters associated with a cone are the position of its apex, its taper, its axis angle, and its form. If the ratio of the form to the maximum vector of the minimum bounding box is greater than 1/50, the special error routine is invoked, step 162 and processing returns, step 164. This completes the general processing for the first subroutine, step 78, FIG. 3.

The second subroutine, step 82, FIG. 3, begins with an evaluation to determine if the ratio of the length of the minimum vector of the bounding box to the maximum vector length is less than 1/20, and the ratio of the minimum vector to the medium vector is less than 1/20, and whether the average probe direction is approximately the same as the minimum bounding box direction vector, step 170, FIG. 6A. If all three criteria are met, a plane is displayed, step 172. The data associated with the plane typically includes its center, its axis, and its form.

If this criteria is not met, a check is made to see whether the ratio of the minimum vector to the maximum vector is less than 1/5, step 174. If this criteria is not met, processing according to the third subroutine begins, step 176 as described with respect to FIG. 7. If the ratio of the minimum vector to the maximum vector is less than 1/5, an arc is calculated, step 178. If the calculations pass, step 180, the arc angle is calculated, step 182; otherwise a special error routine is generated, step 184 and processing returns, step 186. If the arc angle is less than 15°, step 190, FIG. 6B, and the ratio of the medium vector to the maximum vector is greater than 1/10, step 200, a plane is displayed, step 202. Otherwise, a line is displayed, step 204. If the ratio of the form to the maximum dimension of the bounding box is less than 1/20 and there are less than six data points, step 208, and the arc angle is greater than 195°, step 210, a circle is displayed, step 212; otherwise an arc is displayed, step 214. If the criteria of step 208 are not met, a check is made to see whether the ratio of the form to the maximum direction of the bounding box is greater than 1/20, and whether the data points entered total six or more, step 216; if so a special error routine is invoked, step 218.

If the criteria of steps 208, and 216 are not met, processing begins with the third subroutine, step 220. If less than six data points have been entered, step 240, FIG. 7, a sphere is displayed, step 242. The typical data associated with a sphere to be displayed to the operator include its center point, its radius, its diameter, and its form. If more than six data points have been entered, two circles are calculated, step 244. For example, the first three data points make up the first circle and the next three data points make up the second circle. The normal vectors for both circles are than calculated, step 246 and if they are within 30° and the radius of the circles are approximately equal, step 248, a cylinder is calculated, step 250. If the calculations pass, step 252, the cylinder is displayed, step 254 and otherwise a special error routine is invoked, step 256. The criteria of step 248 are not met, a cone is calculated, step 258 and if the calculations pass, step 260, a cone is displayed, step 262. Otherwise the special error routine is invoked, step 264.

The special error routine is a unique component of this invention because the operator is not required to stop entering data points if the algorithm cannot determine the feature type represented by the entered data points. Instead, all the data points are stored, step 286, FIG. 8 and flagged, step 288. A point is typically displayed with the flag so that the user can change the function selection manually to generate the desired feature type to be displayed. Processing then continues for the next feature. In this way, even though the algorithms described above do not definitely reach a conclusion with respect to a particular feature type, the data points are at least stored and flagged such that an operator or analyst can later determine what the feature type should have been. This feature is a component of the hands off approach inherent in the subject invention. Later, the operator or analyst can invoke a change function, step 290, FIG. 9. The system then reads all the data points, step 292 which were stored in step 286, FIG. 8 and calculates a chosen shape, step 294 manually entered by the operator. For example, the operator uses feature list 300, FIG. 10, to select a feature type and the programming will then force the data points to fit that feature. Note that this extra step is only required in the rare case when the algorithm described above fails to classify the data points as representing a particular type of feature. Normally, however, the direction of probe movement, the size of the minimum bounding box which contains the entered data points, and the other criteria discussed above are used to determine the feature type without need for the operator to select the feature type before the data points are entered. Thus, the direction of movement of the probe at each contact with a feature of the object is used as one important mechanism for automatically determining the type of feature defined by the data points entered. The direction of movement of the probe is used at step 106, FIG. 4 to distinguish between a line and error or distance condition; and to distinguish between a line and a long narrow cylinder in step 128, FIG. 5A. The direction motion of the probe is also used in step 170, FIG. 6A to distinguish between a plane and an arc. The calculation of the minimum bounding box vectors (direction and length) and the use of the ratio of the length of these vectors is also unique. This information is used to invoke processing according to the different routines shown at steps 78, 82, and 86, FIG. 3 and explained in detail in FIGS. 6A–6B, 7A–7B and 8. Each routine further uses the direction of probe movement information and the number of data points entered along with the established ratios of the bounding box vectors to classify features from the coordinates of the data points entered by the operator. These calculations eliminate the need for the operator to specify the feature type under inspection before the data points are entered by the operator. Other information used by the algorithm to classify feature types include the arc angle, radius, and the form as discussed above. The difficulty of distinguishing between a set of data points which could form a long narrow cylinder, a long narrow cone, or simply a line is thus overcome in the subject invention.

The following source code represents one method of implementing the processing methodology described above.

```
long EigenvectorsOfCloud(long pp, T_dl_hnd cloud, double vals[], double vecs[])
{
        _SWTrace("EigenvectorsOfDataCloud");
        long j, stat;
        double x, y, z;
        double xx, xy, zx, yy, yz, zz;
        double pos[3], m[9];
        double test[9];

long np = GetOrigNumPtsDataCloud(cloud);
        if (np==1) return FALSE;

T_pt pt1 = DEFAULT_PT76;
        T_pt pt2 = DEFAULT_PT76;

if ((np==2) && (pp==PROJ_OFF))
        {
                Zero3(vals);            vals[0] = 1;
                DlGetData(cloud, "0", (void*)&pt1, sizeof(pt1), DTH_PT76);
                DlGetData(cloud, "1", (void*)&pt2, sizeof(pt2), DTH_PT76);

SubPoint(pp, pt2.pos, pt1.pos, vecs);
                if (!NormalizeVector(pp, vecs, vecs)) return FALSE;
                PerpVector(pp, vecs, &vecs[3]);
                if (pp==PROJ_OFF) CrossVector(vecs, &vecs[3], &vecs[6]);
                return TRUE;
        }

AveragePosDataCloud(cloud, pos);

xx = xy = zx = yy = yz = zz = 0.0;
        long i;
        char tag[10];
        for (i=0; i<np; i++)
        {
                StrSet(tag, sizeof(tag), i);
                DlGetData(cloud, tag, (void*)&pt1, sizeof(pt1), DTH_PT76);
                x = pt1.pos[0] - pos[0];
                y = pt1.pos[1] - pos[1];
                z = pt1.pos[2] - pos[2];
                xx += (x*x);    xy += (x*y);    zx += (x*z);
                yy += (y*y);    yz += (y*z);
                zz += (z*z);
        }
```

```
        switch (pp)
        {
                case PROJ_OFF:
                        m[0] = xx;
                        m[1] = m[3] = xy;
                        m[2] = m[6] = zx;
                        m[4] = yy;
                        m[5] = m[7] = yz;
                        m[8] = zz;
                        break;
                case XY_PLANE:
                        m[0] = xx;
                        m[1] = m[2] = xy;
                        m[3] = yy;
                        break;
                case YZ_PLANE:
                        m[0] = yy;
                        m[1] = m[2] = yz;
                        m[3] = zz;
                        break;
                case ZX_PLANE:
                        m[0] = zz;
                        m[1] = m[2] = zx;
                        m[3] = xx;
                        break;
        }

/* the following functions find the eigenvectors of the 2X2 or 3X3 matrix */
        if (pp==PROJ_OFF) stat = OSD_EigenExpand(3, m, vals, vecs);
        else              stat = OSD_EigenExpand(2, m, vals, vecs);

if (!stat) { _SWError("eig failed"); return FALSE; } if (pp==PROJ_OFF)
                for (i=0; i<3; i++)
                        for (j=0; j<3; j++) test[i*3+j] = vecs[j*3+i];

if (pp!=PROJ_OFF)
                for (i=0; i<2; i++)
                        for (j=0; j<2; j++) test[i*2+j] = vecs[j*2+i];

for (i=0; i<9; i++) vecs[i] = test[i];

return TRUE;
} void MMFailed(T_dl_hnd f, char *reason)
{
        G_log<<reason<<CR;
        DlAddNoData(f, DI_FAILED);
} void MMWarning(char *reason)
{
        G_log<<reason<<CR;
}
```

MEC-103J
kct

```c
/* these functions call the appropriate least squares best fit routine
void Point(T_dl_hnd f, char *dcid)
{
    T_di_hnd di = DlGetDi(f, DI_FAILED);
    if (di) { DlRmvDi(f, DI_FAILED); DiDel(di); }

DlSetLong4(f, DI_FTYPE, C_POINT);
    T_dl_hnd cmd = DlNew(CMD_NEW_PROBED_POINT, 0);
    DlAddNoData(cmd, DI_ESTIMATE);
    DlAddStr(cmd, DI_DC_LIST, dcid);
    _CmdIssue(cmd, f);
    DlDel(cmd);
} void Line(T_dl_hnd f, char *dcid)
{
    T_di_hnd di = DlGetDi(f, DI_FAILED);
    if (di) { DlRmvDi(f, DI_FAILED); DiDel(di); }

DlSetLong4(f, DI_FTYPE, C_LINE);
    T_dl_hnd cmd = DlNew(CMD_NEW_PROBED_LINE, 0);
    DlAddNoData(cmd, DI_ESTIMATE);
    DlAddStr(cmd, DI_DC_LIST, dcid);
    _CmdIssue(cmd, f);
    DlDel(cmd);
} void Circle(T_dl_hnd f, char *dcid)
{
    T_di_hnd di = DlGetDi(f, DI_FAILED);
    if (di) { DlRmvDi(f, DI_FAILED); DiDel(di); }

DlSetLong4(f, DI_FTYPE, C_CIRCLE);
    T_dl_hnd cmd = DlNew(CMD_NEW_PROBED_CIRCLE, 0);
    DlAddNoData(cmd, DI_ESTIMATE);
    DlAddStr(cmd, DI_DC_LIST, dcid);
    _CmdIssue(cmd, f);
    DlDel(cmd);
} void Arc(T_dl_hnd f, char *dcid)
{
    T_di_hnd di = DlGetDi(f, DI_FAILED);
    if (di) { DlRmvDi(f, DI_FAILED); DiDel(di); }

DlSetLong4(f, DI_FTYPE, C_ARC);
    T_dl_hnd cmd = DlNew(CMD_NEW_PROBED_ARC, 0);
    DlAddNoData(cmd, DI_ESTIMATE);
    DlAddStr(cmd, DI_DC_LIST, dcid);
    _CmdIssue(cmd, f);
    DlDel(cmd);
}
```

```
void Plane(T_dl_hnd f, char *dcid)
{
        T_di_hnd di = DlGetDi(f, DI_FAILED);
        if (di) { DlRmvDi(f, DI_FAILED); DiDel(di); }

DlSetLong4(f, DI_FTYPE, C_PLANE);
        T_dl_hnd cmd = DlNew(CMD_NEW_PROBED_PLANE, 0);
        DlAddNoData(cmd, DI_ESTIMATE);
        DlAddStr(cmd, DI_DC_LIST, dcid);
        _CmdIssue(cmd, f);
        DlDel(cmd);
} void Sphere(T_dl_hnd f, char *dcid)
{
        T_di_hnd di = DlGetDi(f, DI_FAILED);
        if (di) { DlRmvDi(f, DI_FAILED); DiDel(di); }

DlSetLong4(f, DI_FTYPE, C_SPHERE);
        T_dl_hnd cmd = DlNew(CMD_NEW_PROBED_SPHERE, 0);
        DlAddNoData(cmd, DI_ESTIMATE);
        DlAddStr(cmd, DI_DC_LIST, dcid);
        _CmdIssue(cmd, f);
        DlDel(cmd);
} void Cylinder(T_dl_hnd f, char *dcid)
{
        T_di_hnd di = DlGetDi(f, DI_FAILED);
        if (di) { DlRmvDi(f, DI_FAILED); DiDel(di); }

DlSetLong4(f, DI_FTYPE, C_CYLINDER);
        T_dl_hnd cmd = DlNew(CMD_NEW_PROBED_CYLIND, 0);
        DlAddNoData(cmd, DI_ESTIMATE);
        DlAddNoData(cmd, DI_MP);
        DlAddStr(cmd, DI_DC_LIST, dcid);
        _CmdIssue(cmd, f);
        DlDel(cmd);
} void Cone(T_dl_hnd f, char *dcid)
{
        T_di_hnd di = DlGetDi(f, DI_FAILED);
        if (di) { DlRmvDi(f, DI_FAILED); DiDel(di); }

DlSetLong4(f, DI_FTYPE, C_CONE);
        T_dl_hnd cmd = DlNew(CMD_NEW_PROBED_CONE, 0);
        DlAddNoData(cmd, DI_ESTIMATE);
        DlAddNoData(cmd, DI_MP);
        DlAddStr(cmd, DI_DC_LIST, dcid);
        _CmdIssue(cmd, f);
        DlDel(cmd);
}
```

```
long ParaWithin30Degrees(double cosa)
{
    if (fabs(cosa) > 0.866 ) return TRUE;
    return FALSE;
} long ParaWithin45Degrees(double cosa)
{
    if (fabs(cosa) > 0.707 ) return TRUE;
    return FALSE;
} long RoughlyEqualRadius(double r1, double r2)
{
    double t0;
    t0 = r1/20;
    if ((r2 < (r1+t0)) && (r2 > (r1-t0))) return TRUE;
    else return FALSE;
}

/* this function calculates the minimum bounding box dimensions and directions long MeasureMagicBasis(T_dl_hnd f, T_dl_hnd r)
{
    char cloudid[NORMAL_BUF];
    DlGetData(f, DI_DC_LIST, (void*)cloudid, sizeof(cloudid), DTH_STR);
    T_dl_hnd fdc = DbGetDl(DS_DCLOUD, cloudid);
    if (fdc==0) { MMFailed(f, "No Cloud Found"); return FALSE; } long np, unused;
    T_bool1 zrp = FALSE;
    T_bool1 mrp = FALSE;
    if (!GetCloudHeader(fdc, &np, &unused, &zrp, &mrp))
    { MMFailed(f, "No Cloud Header"); return FALSE; } if (np==0) { MMFailed(f, "No points"); return FALSE; }

DlAddLong4(r, DI_ORIG_NP, np);
    DlAddBool1(r, DI_MULTI_PROBE, mrp);

double mineigvec[4] = DEFAULTZ_VEC32;
    DlAddVec32(r, "mineigvec", mineigvec);    // initialize minimum eig vector double evol[4] = DEFAULT_POS32;
    DlAddPos32(r, "eigvolumn", evol);    // initialize eig  volumn to zero
    DlAddPos32(r, "partvolumn", evol);   // initialize part volumn to zero // find average and absolute probe direction
    double absp[4] = DEFAULTZ_VEC32;
    AbsDirDataCloud(fdc, absp);
    DlAddVec32(r, "absprbdir", absp);

if (np==1) return TRUE;

T_dl_hnd comp = NewDataCloud("comp");
    if (comp==NULL)   return FALSE;
```

```
//  section to find min and max of smallest bounding box
//  if we are not using a zero radius probe, do an approx probe compensation
//  on all points (based simply on the probe direction of each point)
if (zrp) CopyDataCloud(fdc, comp);
else    ProbeCompensateCloud(PROJ_OFF, fdc, comp);

double min[4] = DEFAULT_POS32;
double max[4] = DEFAULT_POS32;

// find extremes of part coordinates
ExtremesOfDataCloud(comp, min, max);
double pvol[4] = DEFAULT_POS32;
SubPoint(PROJ_OFF, max, min, pvol);
DlSetPos32(r, "partvolumn", pvol);   // actual part coordinates volumn if (AboutZeroPoint(PROJ_OFF, pvol)) return TRUE;

// find the directions of the minimum bounding box... see subroutine above
double vals[3], vecs[9];
EigenvectorsOfCloud(PROJ_OFF, comp, vals, vecs);

Copy3(&vecs[6], mineigvec);
DlSetVec32(r, "mineigvec", mineigvec);     // actual minimum eig vector double prime[4] = DEFAULTZ_VEC32;
double secondary[4] = DEFAULTX_VEC32;
Copy3(&vecs[0], prime);
long pax = LargestComponent(PROJ_OFF, prime);
long x, y, u;
ProjectionIndices(pax, &x, &y, &u);
if (LargestComponent(PROJ_OFF, &vecs[3])==x)
      Copy3(&vecs[3], secondary);
else
      Copy3(&vecs[6], secondary);

// rotate minimum bounding box in order to find the extremes
// (and thus the dimensions) of the minimum bound box
T_dl_hnd rf = RFNew("MAGIC00");
// create a new coordinate system which is based on the vectors
// of the minimum bounding box
RFSetPrimaryAndSecondary(rf, prime, secondary);
WorldToPartCloud(rf, comp, comp);
ExtremesOfDataCloud(comp, min, max);
DlDel(rf);
DisposeDataCloud(comp);

// bounds found
SubPoint(PROJ_OFF, max, min, evol);
DlSetPos32(r, "eigvolumn", evol);    // actual eig volumn return TRUE;
}
```

MEC-103J
kct

```
void MeasureMagic3dOnly(T_dl_hnd f)
{
        // same as full measure magic but constrain results to:
        // point, sphere, cylinder, cone, or plane
} void MeasureMagic2dOnly(T_dl_hnd f)
{
        // same as full measure magic but constrain results to:
        // point, line, arc, circle (projected features)
} void MeasureMagic(T_dl_hnd f)
{
        // We assume that the projection plane is stored in the feature long pp = PROJ_OFF;
        DlGetData(f, DI_PROJECTION, (void*)&pp, sizeof(pp), DTH_LONG4);
        if (pp==PROJ_OFF) { MeasureMagic3dOnly(f); return; }
        if (pp!=AUTO_PLN) { MeasureMagic2dOnly(f); return; } char cloudid[NORMAL_BUF];
        DlGetData(f, DI_DC_LIST, (void*)cloudid, sizeof(cloudid), DTH_STR);
        T_dl_hnd fdc = DbGetDl(DS_DCLOUD, cloudid);
        if (fdc==0) { MMFailed(f, "No Cloud Found"); return; }

// Now we know we are in auto projection
        // find the most likely 2D projection of the data cloud
        pp = AutoProjection(fdc);
        DlSetLong4(f, DI_PROJECTION, pp);

// call subroutine to find the dimensions and directions
        // of the minimum bounding box
        // and the average probe direction
        T_dl_hnd r = DlNew("result", 0);
        if (!MeasureMagicBasis(f, r)) return;

T_long4 np = 0;
        T_bool1 mrp = TRUE;
        double minv[4] = DEFAULTZ_VEC32;
        double evol[4] = DEFAULT_POS32;
        double absp[4] = DEFAULTZ_VEC32;
        double pvol[4] = DEFAULT_POS32;

DlGetData(r, DI_ORIG_NP, (void*)&np, sizeof(np), DTH_LONG4);
        DlGetData(r, DI_MULTI_PROBE, (void*)&mrp, sizeof(mrp), DTH_BOOL1);
        DlGetData(r, "mineigvec", (void*)minv, sizeof(minv), DTH_VEC32);
        DlGetData(r, "eigvolumn", (void*)evol, sizeof(evol), DTH_POS32);
        DlGetData(r, "absprbdir", (void*)absp, sizeof(absp), DTH_VEC32);
        DlGetData(r, "partvolumn", (void*)pvol, sizeof(pvol), DTH_POS32);

DlDel(r);
```

```
// find the minimum, medium, and maximum dimensions of the bounding box
long minie = SmallestComponent(PROJ_OFF, evol);
long maxie = LargestComponent(PROJ_OFF, evol);
long other = 0;
long x, y, u;
ProjectionIndices(maxie, &x, &y, &u);
if (minie==x) other=y; else other=x;

// set the poor_form test threshold to be 1/50 of the maximum
// bounding box dimension
double poor_form = evol[maxie]/50.0;

find the minimum and maximum component of the probe direction
long minid = SmallestComponent(PROJ_OFF, absp);
long maxid = LargestComponent(PROJ_OFF, absp);

long miniv = SmallestComponent(PROJ_OFF, pvol);
long maxiv = LargestComponent(PROJ_OFF, pvol);

long oned, twod, threed;
oned = twod = threed = FALSE;
if (evol[minie] < (evol[maxie]/10))
{
      if (evol[other] < (evol[maxie]/10)) oned = TRUE;
      else                                              twod = TRUE;
}
else
      threed = TRUE;

// Take care of the trivial case
if (np==1) { Point(f, cloudid); return; }
if (AboutZeroPoint(pp, pvol)) { Point(f, cloudid); return; } double form = 0;
double cylform = 0;

if (np==2) // could be line or average point
{
      ProjectVector(pp, absp, absp);
      NormalizeVector(pp, pvol, pvol);
      double cosa = DotProduct(pp, pvol, absp);

if (ParaWithin45Degrees(cosa)) { Point(f, cloudid); return; }
      else                           { Line(f, cloudid); return; }
}
```

```
if (oned)   // about one dimesnion to the data cloud
{
        if (np<6)
        {
                Line(f, cloudid);
                if (DlGetDi(f, DI_FAILED))
                        { MMWarning("Line failed"); Point(f, cloudid); return; }
                DlGetData(f, DI_FORM, (void*)&form, sizeof(form), DTH_DBL8);
                if (form > poor_form) MMWarning("Poor fit line");
                return;
        } if ((evol[minie] < (evol[maxie]/50)) &&
                (evol[other] < (evol[maxie]/50)))
        {
                Line(f, cloudid);
                if (DlGetDi(f, DI_FAILED))
                        { MMWarning("Line failed"); Point(f, cloudid); return; }
                DlGetData(f, DI_FORM, (void*)&form, sizeof(form), DTH_DBL8);
                if (form > poor_form) MMWarning("Poor fit line");
                return;
        } if ((evol[minie] < (evol[maxie]/20)) &&
                (evol[other] < (evol[maxie]/20)))
                if (maxid == LargestComponent(PROJ_OFF, minv))
                {
                        Line(f, cloudid);
                        if (DlGetDi(f, DI_FAILED))
                        { MMWarning("Line failed"); Point(f, cloudid); return; }
                        DlGetData(f, DI_FORM, (void*)&form, sizeof(form), DTH_DBL8);
                        if (form > poor_form) MMWarning("Poor fit line");
                        return;
                }

DlSetLong4(f, DI_PROJECTION, PROJ_OFF);

Cylinder(f, cloudid);
        if (DlGetDi(f, DI_FAILED))
                { MMWarning("Cylinder failed"); Point(f, cloudid); return; }

DlGetData(f, DI_FORM, (void*)&cylform, sizeof(cylform), DTH_DBL8);
        if (cylform < poor_form) return;   // One D cylinder OK Cone(f, cloudid);
        if (DlGetDi(f, DI_FAILED))
                { MMWarning("Cone failed"); Point(f, cloudid); return; }

DlGetData(f, DI_FORM, (void*)&form, sizeof(form), DTH_DBL8);
        if (form < poor_form) return;   // One D cone OK if (cylform < form)
        {
                Cylinder(f, cloudid);
                MMWarning("Poor fit cylinder");
                return;
        }

MMWarning("Poor fit cone");
        return;
}
```

MEC-103J
kct

```
if (twod)
      if ((evol[minie] < (evol[maxie]/20)) &&
           (evol[minie] < (evol[other]/20)))
          if (maxid == LargestComponent(PROJ_OFF, minv))
          {
                 DlSetLong4(f, DI_PROJECTION, PROJ_OFF);
                 Plane(f, cloudid);
                 if (DlGetDi(f, DI_FAILED))
                 { MMWarning("Plane failed"); Point(f, cloudid); return; }
                 DlGetData(f, DI_FORM, (void*)&form, sizeof(form), DTH_DBL8);
                 if (form > poor_form) MMWarning("Poor fit plane");
                 return;
          }

T_pt pt = DEFAULT_PT76;
double pts[6][3];
long i = 0;

// Get cosa and length for 2D tests
double pos1[4], dir1[4], r1;
double pos2[4], dir2[4], r2;
double cosa, length;

if (np>=6)
{
      for (i=0; i<6; i++)
            { GetPtFromCloud(fdc, i, &pt); Copy3(pt.pos, pts[i]); }
      TwoCircles(pts, pos1, dir1, &r1, pos2, dir2, &r2);
      cosa = DotProduct(PROJ_OFF, dir1, dir2);
      length = DistanceBetweenPoints(PROJ_OFF, pos1, pos2);
}
```

```
// liberal 2D tests
if (pvol[miniv] < (pvol[maxiv]/5.0))
{
        // if (np==5) do slot test...
        // add slot to list of possible outcomes in the future Arc(f, cloudid);
        if (DlGetDi(f, DI_FAILED))
              { MMWarning("Arc failed"); Point(f, cloudid); return; } double angle = 0;
        DlGetData(f, DI_ANGLE, (void*)&angle, sizeof(angle), DTH_DBL8);
        if (angle > (RAD180 + RAD015)) DlSetLong4(f, DI_FTYPE, C_CIRCLE);

if (angle > RAD015)
        {
              DlGetData(f, DI_FORM, (void*)&form, sizeof(form), DTH_DBL8);
              if (np<6)
              {
                    if (form > poor_form)
                    {
                          if (angle > (RAD180 + RAD015))
                                MMWarning("Poor fit circle");
                          else
                                MMWarning("Poor fit Arc");
                    }
                    return;
              }
              else
              {
                    if ((ParaWithin30Degrees(cosa)) && (length > (r1/5)))
                    {
                          twod = FALSE;
                          threed = TRUE;
                          //G_log<<"switch to 3d"<<CR;
                    }
                    else
                    {
                          if (form > poor_form)
                          {
                                if (angle > (RAD180 + RAD015))
                                      MMWarning("Poor fit circle");
                                else
                                      MMWarning("Poor fit Arc");
                          }
                          return;
                    }

}
       }
```

MEC-103J
kct

```
            if (angle < RAD015)
            {
                    if (evol[other] > (evol[maxie]/10))
                    {
                            DlSetLong4(f, DI_PROJECTION, PROJ_OFF);
                            Plane(f, cloudid);
                            if (DlGetDi(f, DI_FAILED))
                            { MMWarning("Plane failed"); Point(f, cloudid); return; }
                            DlGetData(f, DI_FORM, (void*)&form, sizeof(form), DTH_DBL8);
                            if (form > poor_form) MMWarning("Poor fit plane");
                            return;
                    }
                    else
                    {
                            Line(f, cloudid);
                            if (DlGetDi(f, DI_FAILED))
                            { MMWarning("Line failed"); Point(f, cloudid); return; }
                            DlGetData(f, DI_FORM, (void*)&form, sizeof(form), DTH_DBL8);
                            if (form > poor_form) MMWarning("Poor fit line");
                            return;
                    }
            }
    } if (threed)
    {
            if (np<6)
            {
                    Sphere(f, cloudid);
                    if (DlGetDi(f, DI_FAILED))
                    { MMWarning("Sphere failed"); Point(f, cloudid); return; }
                    DlGetData(f, DI_FORM, (void*)&form, sizeof(form), DTH_DBL8);
                    if (form > poor_form) MMWarning("Poor fit sphere");
                    return;
            } if (ParaWithin30Degrees(cosa))
            {
                    cylform=0;
                    form=0;
                    if (RoughlyEqualRadius(r1, r2))
                    {
                            Cylinder(f, cloudid);
                            if (DlGetDi(f, DI_FAILED))
                            { MMWarning("Cylinder failed"); Point(f, cloudid); return; }
                            DlGetData(f, DI_FORM, (void*)&cylform,
                                    sizeof(cylform), DTH_DBL8);
                            if (cylform < poor_form) return;
                    }
                    else
                    {
                            Cone(f, cloudid);
                            if (DlGetDi(f, DI_FAILED))
                            { MMWarning("Cone failed"); Point(f, cloudid); return; }
                            DlGetData(f, DI_FORM, (void*)&form, sizeof(form), DTH_DBL8);
                            if (form < poor_form) return;
                    }
```

```
                if (form < cylform)
                {
                        MMWarning("Poor fit cylinder");
                        return;
                }

MMWarning("Poor fit cone");
                return;
        }
        else
        {
                Sphere(f, cloudid);
                if (DlGetDi(f, DI_FAILED))
                        { MMWarning("Sphere failed"); Point(f, cloudid); return; }
                DlGetData(f, DI_FORM, (void*)&form, sizeof(form), DTH_DBL8);
                if (form > poor_form) MMWarning("Poor fit sphere");
                return;
        }

}

MMWarning("No fit found");
  Point(f, cloudid);
  return;
}
```

Although specific features of the invention are shown in some drawings and not others, this is for convenience only as some feature may be combined with any or all of the other features in accordance with the invention.

Other embodiments will occur to those skilled in the art and are within the following claims:

What is claimed is:

1. An object inspection system comprising:
   a coordinate measuring device including a touch probe for inspecting an object having one or more feature types;
   a computer subsystem connected to said coordinate measuring device, said computer subsystem including:
   means for storing the direction of movement of said probe at each contact of the probe with a feature on the object;
   means for storing the coordinates of the probe at each contact of the probe with a feature on the object;
   processing means for automatically determining, from the direction of movement of the probe and said coordinates, the feature type defined by the coordinates, said processing means including means for calculating the length of the vectors of a bounding box which includes all said coordinates.

2. The system of claim 1 in which said computer subsystem further includes a display and means for displaying the feature type determined by said processing means.

3. The system of claim 1 further including means for inputting an indication when all the data points for a feature are entered.

4. The system of claim 3 in which said processing means includes means for displaying the coordinates of the probe if only one data point is entered.

5. The system of claim 1 in which said means for calculating further includes means for determining the minimum length vector and the maximum length vector of said bounding box.

6. The system of claim 5 further including means for classifying groups of feature types according to the ratio of lengths of said vectors.

7. The system of claim 5 further including means for classifying groups of feature types according to the ratio of lengths of said vectors and the direction of movement of said probe.

8. The system of claim 5 further including means for classifying groups of feature types according to the ratio of the length of said vectors and the number of data points entered for a feature.

9. The system of claim 5 further including means for classifying groups of feature types according to the ratio of the length of said vectors, the direction of movement of said probe, and the number of data points entered for a feature.

10. The system of claim 5 in which said processing means further includes means for calculating the direction of the minimum length bounding box vector.

11. The system of claim 10 further including means for classifying groups of feature types according to the direction of the minimum length bounding box vector.

12. The system of claim 11 further including means for classifying groups of feature types according to ratio of the lengths of said vectors and the direction of the minimum length bounding box vector.

13. The system of claim 1 in which said computer subsystem further includes means for calculating the form of the feature.

14. The system of claim 13 in which said processing means is responsive to the calculated form for defining the feature type.

15. The system of claim 1 in which said computer subsystem further includes means for checking for calculation failures.

16. The system of claim 15 in which said processing means is responsive to the means for checking for defining the feature type.

17. The system of claim 1 in which said computer subsystem further includes means for calculating the arc angle of a feature.

18. The system of claim 17 in which said processing means is responsive to the calculated arc angle for defining the feature type.

19. The system of claim 1 further including means for checking for calculation failures, and means, responsive to such failures.

20. The system of claim 19 in which said error routine includes means for calculating another feature type.

21. The system of claim 19 in which said error routine includes means for flagging said coordinates and for automatically resuming processing after said coordinates are flagged.

22. An object inspection system comprising:
    a coordinate measuring device including a touch probe for inspecting an object having one or more feature types;
    a computer subsystem connected to said coordinate measuring device, said computer system including:
    means for storing the direction of movement of said probe at each contact of the probe with a feature on the object;
    means for storing the coordinates of the probe at each contact of the probe with a feature on the object;
    means for calculating the length of the vectors of a bounding box which includes all said coordinates;
    means for determining the ratio of the minimum vector to the maximum vector of said bounding box; and
    processing means for automatically determining, from the direction of movement of the probe, said coordinates, and said ratio, the feature type defined by the coordinates.

23. An object inspection system comprising:
    a measuring device for inspecting an object having one or more feature types;
    a computer subsystem connected to said coordinate measuring device, said computer subsystem including:
    means for storing the coordinates of data points entered for a feature on the object;
    means for calculating the length of the vectors of a bounding box which includes all said coordinates;
    means for determining the minimum vector and the maximum vector of said bounding box;
    means for calculating the ratio of said vectors; and
    processing means for automatically determining, from the ratio of said vectors and said coordinates, the feature type defined by the coordinates.

24. The system of claim 23 in which said coordinate measuring device includes a touch probe, the system further including means for storing the direction of movement of said probe at each contact of the probe with a feature of the object.

25. The system of claim 24 in which said processing means is responsive to the direction of movement of the probe for determining the feature type.

26. An object inspection system comprising:
    a coordinate measuring device for inspecting an object having one or more feature type;
    a computer subsystem connected to said coordinate measuring device, said computer subsystem including:

means for calculating the coordinates of each data point entered for a feature on the object;

means for calculating the length of the vectors of a bounding box which includes all said coordinates;

means for calculating the ratio of said vectors; and processing means for automatically determining, from the coordinates and said ratio, the feature type defined by the coordinates, said processing means including:

means for invoking a first routine if said ratio meets a first criteria;

means for invoking a second routine if said ratio meets a second criteria; and means for invoking a third routine if said ratio meets a third criteria.

27. The system of claim 26 in which said first routine includes means for distinguishing between feature types including a line, a long narrow cylinder, and a long narrow cone.

28. The system of claim 26 in which said second routine includes means for distinguishing between feature types including planes, lines, circles and arcs.

29. The system of claim 26 in which said third routine includes means for distinguishing between feature types including spheres, cylinders, and cones.

30. An object inspection method comprising:

using a coordinate measuring device including a touch probe to inspect an object having one or more feature types;

programming a computer subsystem connected to said coordinate measuring device to:
store the direction of movement of said probe at each contract of the probe with a feature on the object;
store the coordinates of the probe at each contact of the probe with a feature on the object;
calculating the length of the vectors of a bounding box which includes all said coordinates; and
automatically determining, from the direction of movement of the prove and said coordinates, the feature type defined by the coordinates.

31. The method of claim 30 further including displaying the feature type determined by said processing means.

32. The method of claim 30 further including inputting an indication when all the data points for a feature are entered.

33. The method of claim 32 further including displaying the coordinates of the probe if only one data point is entered.

34. The method of claim 30 further including determining the minimum vector and the maximum vector of said bounding box.

35. The method of claim 34 further including classifying groups of feature types according to the ratio of said vectors.

36. The method of claim 34 further including classifying groups of feature types according to the ratio of said vectors and the direction of movement of said probe.

37. The method of claim 34 further including classifying groups of feature types according to the ratio of said vectors and the number of data points entered for a feature.

38. The method of claim 34 further including classifying groups of feature types according to the ratio of said vectors, the direction of movement of said probe, and the number of data points entered for a feature.

39. The method of claim 34 further including defining a feature to be a line if the ratio of the vectors is less than the first preset threshold and the direction of movement of the probe meets a second preset threshold.

40. The method of claim 34 further including automatically defining the feature to be a plane if the ratio of the vectors is less than a third preset threshold and the direction of movement of the probe meets a fourth preset threshold.

41. The method of claim 34 further including automatically defining the feature to be long narrow cylinder if the ratio of the vectors is less than a fifth preset threshold and the direction of movement of the probe meets a sixth preset threshold.

42. The method of claim 30 further including calculating the form of the feature.

43. The method of claim 42 further including using the calculated form to define the feature type.

44. The method of claim 30 further including checking for calculation failures.

45. The method of claim 44 further including using calculation failures to define the feature type.

46. The method of claim 30 further including calculating the arc angle of a feature.

47. The method of claim 46 further including using the calculated arc angle to define the feature type.

48. The method of claim 32 further including checking for calculation failures.

49. The method of claim 48 further including invoking an error routine in response to calculation failures.

50. The method of claim 49 in which said error routine flags said coordinates and automatically resumes processing after said coordinates are flagged.

51. An object inspection method comprising:

using a coordinate measuring device including a touch probe for inspecting an object having one or more feature types;

storing the direction of movement of said probe at each contact of the probe with a feature on the object;

storing the coordinates of the probe at each contact of the probe with a feature on the object;

calculating the length of the vectors of a bounding box which includes all said coordinates;

determining the ratio of the minimum vector to the maximum vector of said bounding box; and automatically determining, from the direction of movement of the probe, said coordinates, and said ratio, the feature type defined by the coordinates.

52. An object inspection method comprising:

using a measuring device for inspecting an object having one or more feature types and for calculating the coordinates of data points entered for a feature on the object;

calculating the length of the vectors of a bounding box which includes all said coordinates;

determining the minimum vector and the maximum vector of said bounding box;

calculating the ratio of said vectors; and automatically determining, from the ratio of said vectors and said coordinates, the feature type defined by the coordinates.

53. The system of claim 52 in which said coordinate measuring device includes a touch probe, the method further including storing the direction of movement of said probe at each contact of the probe with a feature of the object.

54. The method of claim 53 further including using the direction of movement of the probe for determining the feature type.

55. An object inspection method comprising:

using a coordinate measuring device for inspecting an object having one or more feature type and for calculating the coordinates of each data point entered for a feature on the object;

calculating the length of the vectors of a bounding box which includes all said coordinates;

calculating the ratio of said vectors; and automatically determining, from the coordinates and said ratio, the feature type defined by the coordinates, including:

invoking a first routine if said ratio meets a first criteria;

invoking a second routine if said ratio meets a second criteria; and invoking a third routine if said ratio meets a third criteria.

56. The method of claim 55 in which said first routine distinguishes between feature types including a line, a long narrow cylinder, and a long narrow cone.

57. The method of claim 55 in which said second routine distinguishes between feature types including planes, lines, circles and arcs.

58. The method of claim 55 in which said third routine distinguishes between feature types including spheres, cylinders, and cones.

* * * * *